United States Patent
Lonardi et al.

[11] Patent Number: 6,010,041
[45] Date of Patent: Jan. 4, 2000

[54] DEVICE FOR DISCHARGE OF BULK MATERIAL FROM A PRESSURE VESSEL

[75] Inventors: Emile Lonardi, Bascharage; Romain Frieden, Breidweiler; Jörg Brinckmann, Differdange; Patrick Hutmacher, Bettembourg, all of Luxembourg

[73] Assignee: Paul Wurth, S.A., Luxembourg

[21] Appl. No.: 09/006,818

[22] Filed: Jan. 14, 1998

Related U.S. Application Data

[63] Continuation of application No. PCT/EP96/03311, Jul. 26, 1996.

[30] Foreign Application Priority Data

Aug. 25, 1995 [LU] Luxembourg ................ 88 648

[51] Int. Cl.[7] .................................................. G01F 11/28
[52] U.S. Cl. ................... 222/427; 222/449; 222/450; 222/504; 222/542; 222/556
[58] Field of Search .................... 414/202, 209, 414/292; 222/504, 542, 556, 449, 426, 427, 444, 445, 450

[56] References Cited

U.S. PATENT DOCUMENTS

| | | |
|---|---|---|
| 2,655,265 | 10/1953 | Little . |
| 3,224,606 | 12/1965 | Schnyder ............................ 222/427 |
| 4,089,429 | 5/1978 | Stock et al. ........................ 414/201 |
| 4,957,221 | 9/1990 | Murray ............................... 222/450 |
| 5,275,215 | 1/1994 | Derby ................................. 222/450 |
| 5,362,393 | 11/1994 | Kuhme . |
| 5,806,725 | 9/1998 | Bennett ............................... 222/450 |

FOREIGN PATENT DOCUMENTS

| | | |
|---|---|---|
| 2556303A1 | 6/1977 | Germany . |
| 178907 | 4/1922 | United Kingdom . |
| WO 82/00992 | 4/1982 | WIPO . |
| WO 97/07880 | 3/1997 | WIPO . |

OTHER PUBLICATIONS

PCT Publication No. WO 97/07880 dated Mar. 6, 1997, Emile Lonardi, et al., Device For Withdrawing Bulk Material from a Pressurised Container (Cover sheet only).
International Preliminary Examination Report dated Nov. 3, 1997 for PCT/EP96/03311.
PCT/IB/Form 308 for PCT/EP96/03311.

*Primary Examiner*—Philippe Derakshani
*Attorney, Agent, or Firm*—Smith, Gambrell & Russell, LLP

[57] ABSTRACT

A device for the discharge of bulk material (96) from a pressure vessel (2) is proposed, which comprises at least one sluice bin (24, 26) with a bottom (42, 44) and a top (40) sluice gate. The sluice bin (24, 26) is arranged under a plate (76, 76'), into which it forms an orifice (28, 30) for the bulk material (96). The top sluice gate (40) has a sealing plate (66), which is arranged above this plate (76, 76') in such a way that it can be positioned above the orifice (28, 30) of the sluice bin (24, 26) and, after a sealing connection to the edge of the orifice (28, 30) has been made, can be forced against this edge by overpressure in the pressure vessel (2).

32 Claims, 13 Drawing Sheets

DEVICE FOR DISCHARGE OF BULK MATERIAL FROM A PRESSURE VESSEL

REFERENCE TO RELATED APPLICATIONS

This application is a continuation of PCT Application No. PCT/EP96/03311, filed Jul. 26, 1996 (PCT Publication No. WO 97/07880), which application is entirely incorporated herein by reference.

FIELD OF THE INVENTION

The invention relates to a device for the discharge of bulk material from a pressure vessel, which comprises at least one sluice bin with a bottom and a top sluice gate.

BACKGROUND OF THE INVENTION

A device of this type is used, for example, in pressure filtration. In this method for the separation of solid/liquid mixtures the dried solid accumulates as bulk material in a pressure vessel, in which an overpressure several bar higher than the ambient pressure prevails. This bulk material generally accumulating continuously must then be discharged from the pressure vessel without an adverse effect on the actual filtration process. For this reason sluice systems with two sluice bins arranged one below the other are generally used, whereby the bins can each be closed in a gastight manner at their bottom ends by means of a sluice gate. Process pressure initially prevails in the two sluice bins, the top sluice gate being open, whereas the bottom one is closed in a gastight manner. The bulk material to be discharged is conveyed into the lower sluice bin until its maximum filling level is achieved. The top sluice gate is then closed in a gastight manner, so that pressure equalisation with the ambient pressure can be carried out in the lower sluice bin, whereas process pressure continues to prevail in the upper sluice bin. After emptying of the lower sluice bin by opening the bottom sluice gate, the latter is closed again and the sluice bin is again brought to process pressure. The top sluice gate is opened and a new sluicing cycle can start.

Rotary flaps, for example, are used as sluice gates. A rotary flap of this type comprises a sealing plate, which can be rotated about an axis, the latter running diametrically through the sealing plate and being arranged horizontally in the lower open end of the respective sluice bin. When the rotary flap is closed, the sealing plate assumes a horizontal position, whereby a seal running radially around the sealing plate rests on the inner wall of the sluice bin. To open the rotary flap the sealing plate is rotated about its axis of rotation into a vertical position, the first of the two halves of the sealing plate projecting upwards into the respective sluice bin, while the second half projects downwards from the sluice bin. Thereby the first half of the sealing plate must be moved against the bulk material lying on the sealing plate. On the one hand this requires quite a high drive power to open the sealing flap, while on the other it results in high wear on the seal in this area. Furthermore if the upper rotary flap is open, the second half of its sealing flap additionally projects downwards into the lower sluice bin. Consequently the maximum filling height of the lower sluice bin is reduced by the amount of the radius of the sealing plate. A dead volume, which must be ventilated or pressurised during each pressure equalisation, but is not available for the discharge of bulk material, thus results in the upper area of the sluice bin.

Flat slide valves can be used for the sluice gates as an alternative to the rotary flaps. These flat slide valves comprise a horizontal closing plate arranged in a casing, which can be moved horizontally in the casing between a first closed position, in which the closing plate closes a transfer duct for the bulk material arranged perpendicularly to the movement plane, and a second open position, in which the transfer duct is unblocked. To seal the transfer duct in the closed position, the closing plate interacts with a seal above it, which is fitted around the transfer duct in the casing. To allow absorption of the forces which the weight of the bulk material lying on the closing plate and the pressure prevailing above the closing plate exert downwards on the closing plate, the latter is generally mounted on supporting rolls, which are arranged around the transfer duct in the casing. As these forces added together produce a significant total force, the supporting rolls are exposed to an extremely high mechanical load. There is a risk that the total force will not be distributed uniformly to all supporting rolls and some of the latter will thus be loaded more heavily. This may lead to mechanical overstressing and fracture of their bearings. The sealing function fails, which in the event of fracture of several bearings leads to a sudden pressure drop in the pressure vessel and the associated reverse shock, which may lead to serious consequential damage to the entire system.

SUMMARY OF THE INVENTION

The task of the invention is consequently to propose a device for the discharge of bulk material from a pressure vessel, which is characterised by a positive self-locking sealing function.

According to the invention this problem is solved by a device for the discharge of bulk material from a pressure vessel, which comprises at least one sluice bin with a bottom and a top sluice gate and in addition is characterised in that at least one sluice bin is arranged below a plate, into which it forms an orifice for the bulk material, and in that the top sluice gate comprises a sealing member, preferably a sealing plate, which is arranged above this plate in such a way that it can be positioned above the orifice of the sluice bin and, after a sealing connection to the orifice edge has been made, can be pressed against this edge by overpressure in the pressure vessel.

If ambient pressure prevails in the sluice bin, overpressure in the pressure space above the sealing plate exerts a downward force on the latter. In contrast to a flat slide valve, however, the exerted force produces a uniform contact of the sealing plate on the underlying plate in this case. Consequently the sealing function of this sealing plate is advantageously intensified and a sudden fall in the overpressure is prevented. As the exerted force is proportional to the prevailing pressure gradient, even a high overpressure in the pressure vessel cannot lead to loss of the sealing function. In fact an increase in the pressure in the pressure vessel produces closer contact between the sealing plate and the edge of the orifice and thus even improved sealing behaviour. If, by contrast, the differential pressure is zero when pressure equalisation with the pressure vessel has taken place in the sluice bin, no contact force is exerted on the sealing plate and the latter can be moved relatively easily into a position above the plate in which the orifice is unblocked.

As the sealing plate is arranged above the orifice of the sluice bin, the total volume of the latter can moreover be utilised as useful volume. In fact the sealing plate is always above the orifice of the sluice bin. For this reason virtually the full height of the sluice bin can be used as filling height and its total volume is available as useful volume.

In a preferred version of the device according to the invention a first and a second sluice bin are arranged under the plate, into which they form a first and second orifice respectively for the bulk material. The sealing plate is arranged above the plate in such a way that it can be positioned as well above the first orifice as above the second orifice and, following a sealing connection to the edge of the respective orifice, can be pressed against this edge by overpressure in the pressure vessel. This tandem version allows alternate filling of one of the two sluice bins, while the other sluice bin can be sealed at the top by the sealing plate, brought to ambient pressure and emptied. In contrast to the conventional device with sluice bins arranged one below the other, the device of the two sluice bins next to each other ensures an extremely low overall height of the sluice system. However, depending of the place of use the overall height of a pressure filtration plant, for example, is an important cost factor. On the other hand, with the same overall height as in a conventional sluice system the capacity of the device can be increased by an extension of the sluice bin. With a limited overall height such an increase in the capacity in a conventional sluice system can generally be achieved only by an increase in the diameter of the sluice bin and thus also the diameter of the sluice gates. However, such an increase in the diameter of the sluice gates causes an increase in the forces acting on the sluice gates because of the differential pressure. If the sealing function of the sluice gate is not positive, this may lead to loss of the sealing function and the associated consequences.

It should also be noted that the described version of the device comprises only one sealing plate, which can alternately seal the orifice of the first sluice bin and the orifice of the second sluice bin. A positive self-locking sealing function exists regardless of the sealed sluice bin.

The device is advantageously designed in such a way that the plate is circular and completely flat, that the orifices for the bulk material are arranged eccentrically and flush with the plate surface, that the sealing plate can be rotated about the centre of the plate and that a scraper is mounted on the sealing plate in such a way that it fully wipes the plate when the sealing plate is turned through 360°.

As the sealing plate interacts with the plate to seal a sluice bin, it is highly important that the plate is not contaminated by bulk material. If bulk material passes between the plate and the sealing plate, the latter does not rest snugly against the plate in the area of the contamination and the sealing function of the sluice gate is not ensured. The scraper, which is mounted, for example, at the front of the sealing plate, wipes over this area of the plate when the sealing plate is positioned above an orifice and removes any bulk material on the plate. Contamination is thus removed from the edge of the orifice on which the sealing plate is subsequently seated, and a sealing connection of the sealing plate to the plate is ensured. As the sealing plate always swivels round in the same direction and through 360°, the contaminations on the plate are pushed in front of the scraper and on subsequent passage over an orifice fall through the latter into the underlying sluice bin. In this way no bulk material can be deposited permanently on the plate and impair the function of the sluice gate.

To reduce wear in the sealing plate and the plate during swivelling of the sealing plate, the latter is advantageously movable perpendicularly to the plate by a hydraulic cylinder. Before a first orifice is unblocked the sealing plate can then be lifted by the hydraulic cylinder until there is no longer any contact between the sealing plate and the plate. The sealing plate can now be swivelled around and positioned above the second orifice without the sealing plate and the plate rubbing against each other. Consequently the life of the plate and sealing plate with a seal possibly arranged underneath is extended, while the drive for rotation of the sealing plate can be dimensioned considerably smaller.

As an alternative to the hydraulic cylinder an elastic element can be assigned to the sealing plate in such a way that with pressure equalisation between the pressure vessel and the sluice bin the sealing plate is lifted from the plate. In this case the sealing plate advantageously has an inflatable seal, which seals the gap between sealing plate and plate in the inflated condition.

In a preferred version the device comprises a discharge opening for the bulk material axially above each orifice of a sluice bin and a retaining device for the bulk material assigned to this discharge opening. A discharge opening of this type limits the lateral extent of the bulk material flow in such a way that all bulk material falling through the opened discharge opening enters the orifice. Consequently bulk material is reliably prevented from falling on to the plate. Furthermore the bulk material can be retained in the discharge opening by the retaining device, so that the sealing plate can be positioned above the underlying orifice without bulk material falling into the latter. The material retention function and sealing function are separated in this way, which additionally prevents contamination of the sealing faces. In addition, the weight of the retained bulk material does not rest on the sealing plate, but on the retaining device. When the sealing plate is lifted from the plate, only its dead weight need thus be lifted, with the result that a hydraulic cylinder or flexible element for lifting can have correspondingly small dimensions. This is in turn of certain interest with regard to the overall height.

The bulk material retaining device may, for example, have a closing plate, which can be positioned together with the sealing plate and is arranged and designed in such a way that it closes the discharge opening when the sealing plate is arranged above the corresponding orifice. The closing plate and the sealing plate are preferably mounted on a common rotary arm. This embodiment saves an additional drive for the retaining device and it is ensured that when the sealing plate is swivelled over an orifice the retaining device interrupts the bulk material flow at the same time. The closing plate preferably projects in the direction of rotation over the sealing plate and has a central recess. During swivelling into a bulk material flow, this flow is initially interrupted by the projecting area of the closing plate before the sealing plate passes under the discharge opening. Consequently bulk material cannot reach the sealing plate and from here the plate. The special embodiment of the closing plate with a central recess additionally promotes this advantageous effect. Because of the central recess the bulk material flow is last interrupted in an area, in which the distance between the hypothetical extension of the discharge opening and the orifice is a maximum. Furthermore, the areas, in which this distance is a minimum, are interrupted as quickly as possible, a sufficiently large passage cross-section from the discharge opening still being present at this time, so that the bulk material is not sprayed off the closing plate in the direction of rotation and on to the plate.

A further preferred embodiment of the device according to the invention comprises a continuous conveyor in the pressure vessel, which comprises two spaced discharge openings at its conveying end, the first one having a retaining device for the bulk material. This embodiment permits advantageous diversion of the bulk material flow from one sluice bin to the other. If the first discharge opening is opened, the material supplied by the continuous conveyor falls through this discharge opening into the first sluice bin. When its maximum filling height is reached, the retaining device closes the first discharge opening and the first sluice bin can be closed tightly and subsequently emptied. Meanwhile the first, now closed discharge opening is initially filled completely with bulk material. The bulk material, which continues to be supplied by the continuous conveyor, is moved away via the first discharge opening and passes through the second, opened discharge opening into the second sluice bin. When the first sluice bin is emptied, the sealing plate first swivels into a position in which the two sluice bins are open at the top, the retaining device then opens and again unblocks the first discharge opening. The newly supplied bulk material again falls into the first sluice bin, whereas the bulk material between the two discharge openings on the continuous conveyor is transported into the still open second sluice bin. Only then is the second sluice bin sealed and subsequently emptied.

The retaining device for the bulk material may have, for example, two cylindrical closing plates, which overlap in the closed position. These overlapping closing plates may additionally have corresponding cut-out sections, which interact during separation of the closing plates to unblock an opening centred on the axis of the underlying orifice.

To prevent curvature of the plate because of the overpressure prevailing inside the pressure vessel, a pressure chamber is preferably formed by a dished end below the plate with the orifices for the pressure sluices, which is connected to the pressure vessel with pressure compensation.

The bottom sluice gate of the device advantageously has a sealing cap, the concave curvature of which is assigned to the sluice bin. This sealing cap is swivelled sideways to open the bottom sluice gate, the axis of rotation of the swivelling movement running horizontally and through the centre of the cap curvature. As the concave curvature of the sealing cap faces the sluice bin and the axis of rotation thus lies above the sealing cap, the sluice gate cannot open automatically even when all media supplies are interrupted, because the sealing cap is held in its closed position by the force of gravity. Furthermore, the concave curvature aligned with the sluice bin when the bottom sluice gate is closed additionally increases the useful volume of the sluice bin.

For sealing, the bottom sluice gate advantageously has a sealing seat with an inflatable sealing ring. To seal the bottom sluice gate, the sealing ring is exposed to a pressure medium via a duct, so that the sealing ring rests firmly on the inner surface of the sealing cap. If the bottom sluice gate is to be opened, the pressurisation of the sealing ring is stopped in order to reduce the friction with the sealing cap and thus extend the life of the sealing ring.

Furthermore, the inflatable sealing ring may enclose an annular scraper, to which spring means are assigned in such a way that it is forced against the inner curvature of the sealing cap. This scraper removes bulk material from the sealing face of the sealing cap during opening and closing of the bottom sluice gate and thus prevents it from penetrating under the sealing ring and impairing the sealing function. If, moreover, an annular gap which can be connected to a flushing gas supply is arranged between the inflatable sealing ring and the annular scraper, the gap between the sealing face and sealing ring can additionally be cleaned, e.g. with compressed air.

The annular scraper can be clamped in the sealing seat by a flexible plate and supported on the sealing seat e.g. axially via an elastomer ring.

Various embodiments of the invention will now be described below with reference to the enclosed figures.

DETAILED DESCRIPTION OF THE INVENTION

Figure 1:
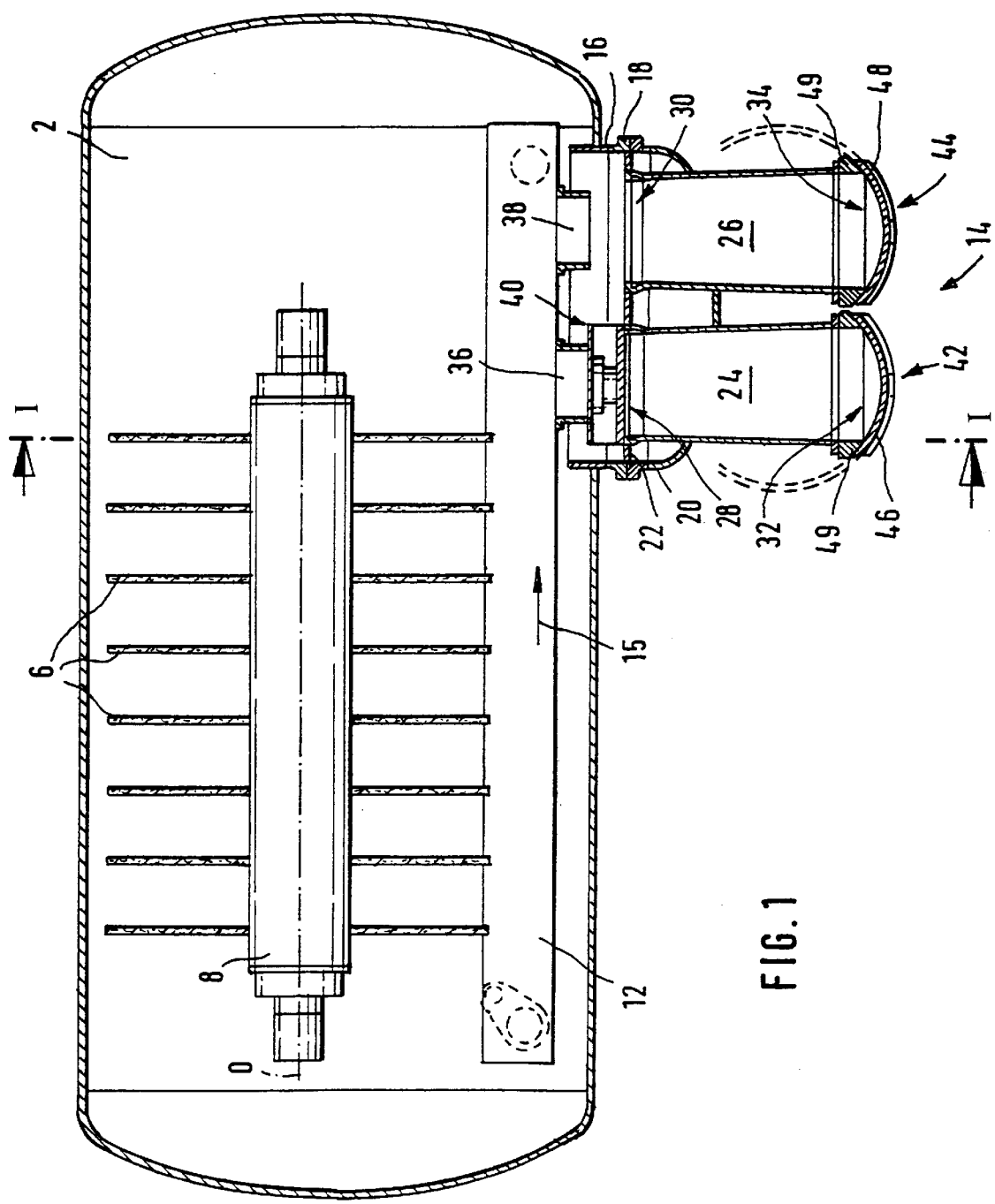
FIG. 1: shows a longitudinal section through a pressure filtration plant with a tandem version of a bulk material sluice according to the invention.
Figure 2:
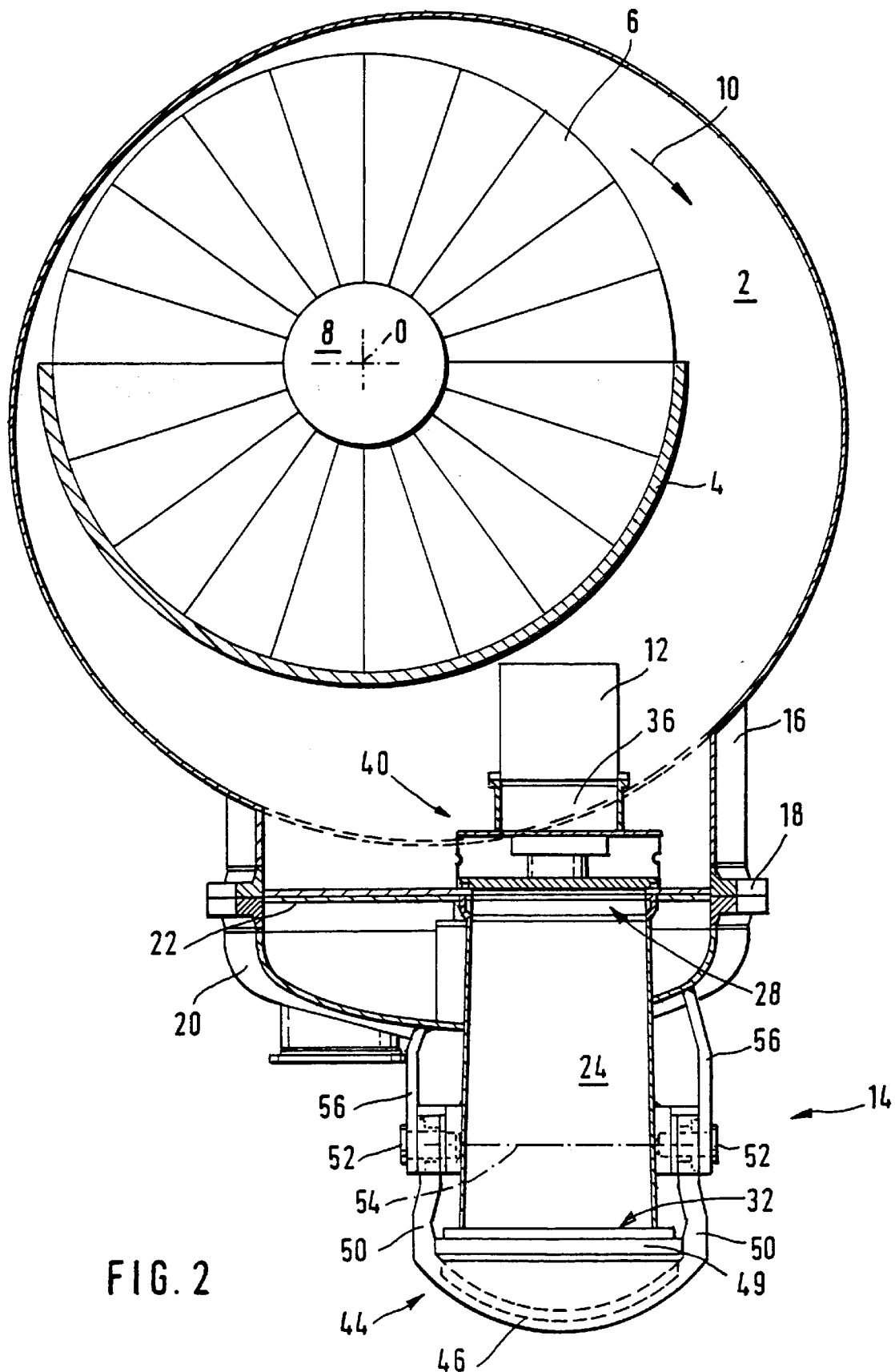
FIG. 2: a cross-section along the line A—A through the plant in FIG. 1.

A pressure filtration plant for the separation of solid/liquid mixtures or suspensions by disc filters is shown schematically in FIG. 1 and FIG. 2. A plant of this type comprises an essentially cylindrical pressure vessel 2, in which an overpressure of up to 8 bar in relation to the outside pressure prevails. A suspension tank 4 (see FIG. 2), which has the shape of a cylinder halved along its longitudinal axis and contains the solid/liquid mixture to be filtered, is arranged inside this pressure vessel 2. Several filter discs 6 arranged one behind the other, which are mounted on a rotating filter shaft 8, are immersed in this suspension tank 4. In their lower area the filter discs 6 consequently come into contact with the suspension. As the overpressure prevails in the suspension tank 4 and outside pressure in the filter discs 6, a filter cake forms on the surface of the filter discs because of the pressure differential. This cake is removed continuously from the suspension by the rotation of the filter discs 6 about the longitudinal axis 0 of the filter shaft 8 (the direction of rotation is indicated by the arrow 10 in FIG. 2), if necessary washed in the upper area and subsequently dried. Before the filter cake is immersed in the suspension again during further rotation, it is thrown or scraped off the filter discs in the right-hand area by a pressure surge and a scraper (not shown) and the dried solid falls via a collecting funnel (likewise not shown) on to a bulk material conveyor 12 installed in the lower area of the pressure vessel 2. This conveyor is designed as a continuous conveyor, e.g. as a chain conveyor. The continuously accumulating, dried bulk material is transported by the bulk material conveyor 12 to a bulk material sluice 14 and discharged from the pressure vessel 2 through this sluice 14. For this purpose the pressure vessel 2 has a cylindrical connection piece 16 with a flange 18, which is open at the bottom, at its rear end under the bulk material conveyor 14 viewed in the conveying direction 15 of the bulk material conveyor 12. A dished end 20, into which a plate 22 is welded, is connected to this flange 18. Two essentially cylindrical sluice bins 24 and 26 are mounted perpendicularly to the dished end 20, and each has an orifice 28 or 30 in the plate 22. The lower end of each sluice bin 24 and 26 projects from the dished end 20 and forms a discharge opening 32 or 34 for the bulk material from the sluice. The two sluice bins 24 and 26 are arranged in such a way that the orifices 28 and 30 are each positioned accurately below the discharge opening of a discharge shaft 36 or 38 of the bulk material conveyor 12. The discharge shafts 36 and 38 are arranged one behind the other and below the conveying end of the bulk material conveyor 12, a vertical gap remaining between the bottom edge of each discharge shaft 36 or 38 and the orifice 28 or 30 of the respective sluice bin 24 or 26. The dried bulk material can fall vertically through the discharge shafts 36, 38 into the respective sluice bins 24, 26 underneath.

An upper sluice gate 40, which alternately closes one of the two orifices 28, 30 of the sluice bins 24, 26 in a gastight manner, is arranged in the vertical gap between the bottom edge of the discharge shafts 36, 38 and the orifices 28, 30 of the sluice bins 24, 26. In the sealed sluice bin 24 or 26 pressure equalisation can then be established with the environment before a bottom sluice gate 42 or 44 of the sluice bin 24 or 26 is opened in order to empty the sluice bin.

The bottom sluice gates 42, 44 advantageously comprise a sealing cap 46 or 48, the concave curvature of which faces the sluice bin 24 or 26 and which interacts when closed with a sealing seat 49 at the lower end of the respective sluice bin 24, 26 in order to close the sluice bin in a gastight manner at its lower end. To open the bottom sluice gates 42, 44 the sealing cap 46, 48 is swivelled upwards at the side. For this purpose each sealing cap 46,48 is mounted with two diametrically opposed rotary arms 50 (see FIG. 2) in such a way on two swivel joints 52 on the outside of the sluice bin 24 or 26, that the (hypothetical) axis of rotation 54 of the rotary arms 52 runs horizontally through the centre of the cap curvature. To allow absorption of the forces acting on the sealing cap when the bin is full, the joints 52 are advantageously additionally supported at their outermost end by stays 56, the upper end of which is fixed to the dished end 20.

Figure 3:
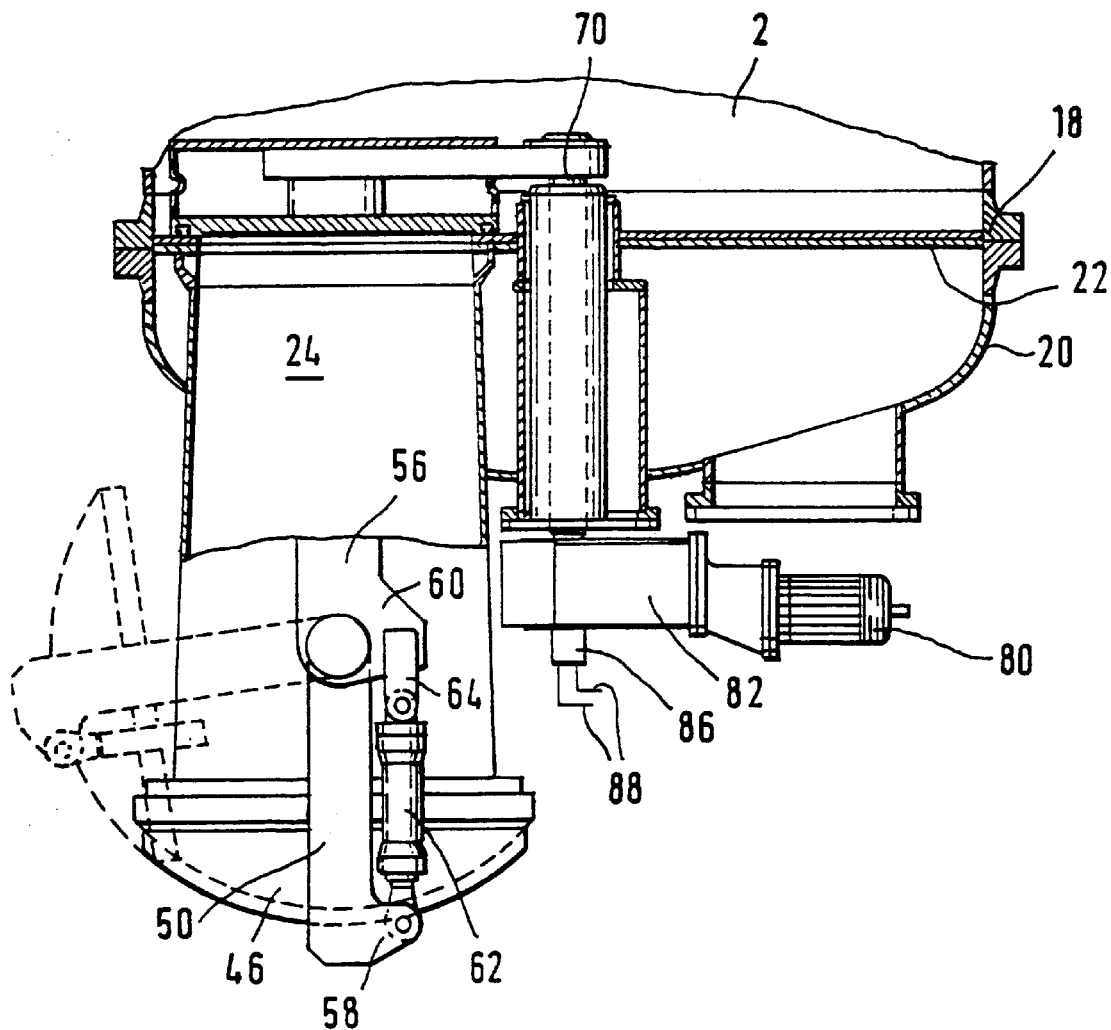
FIG. 3: a partial section of a sluice bin with sluice gates and drives, viewed in the axial direction.

FIG. 3 shows the drive and operating principle of the bottom sluice gates 42, 44. Both the rotary arms 50 and the supporting stays 56 have a flange 58 or 60 facing the opening direction of the sealing cap 46 at their respective bottom ends. A hydraulic cylinder 62 is mounted essentially parallel with the rotary arm 50 between these two flanges 58 and 60. The piston of cylinder 62 is pivoted directly on flange 58, whereas the casing of cylinder 62 is pivoted on a spacer arm 64, which is fixed to flange 60. This device of the hydraulic cylinder 62 produces rotation of the sealing cap 46 about the axis of rotation 54 when the cylinder is actuated. The sealing cap 46 in its lateral position, in which it fully releases the discharge opening of the sluice bin 24, is shown by broken lines in FIG. 3.

Figure 4:
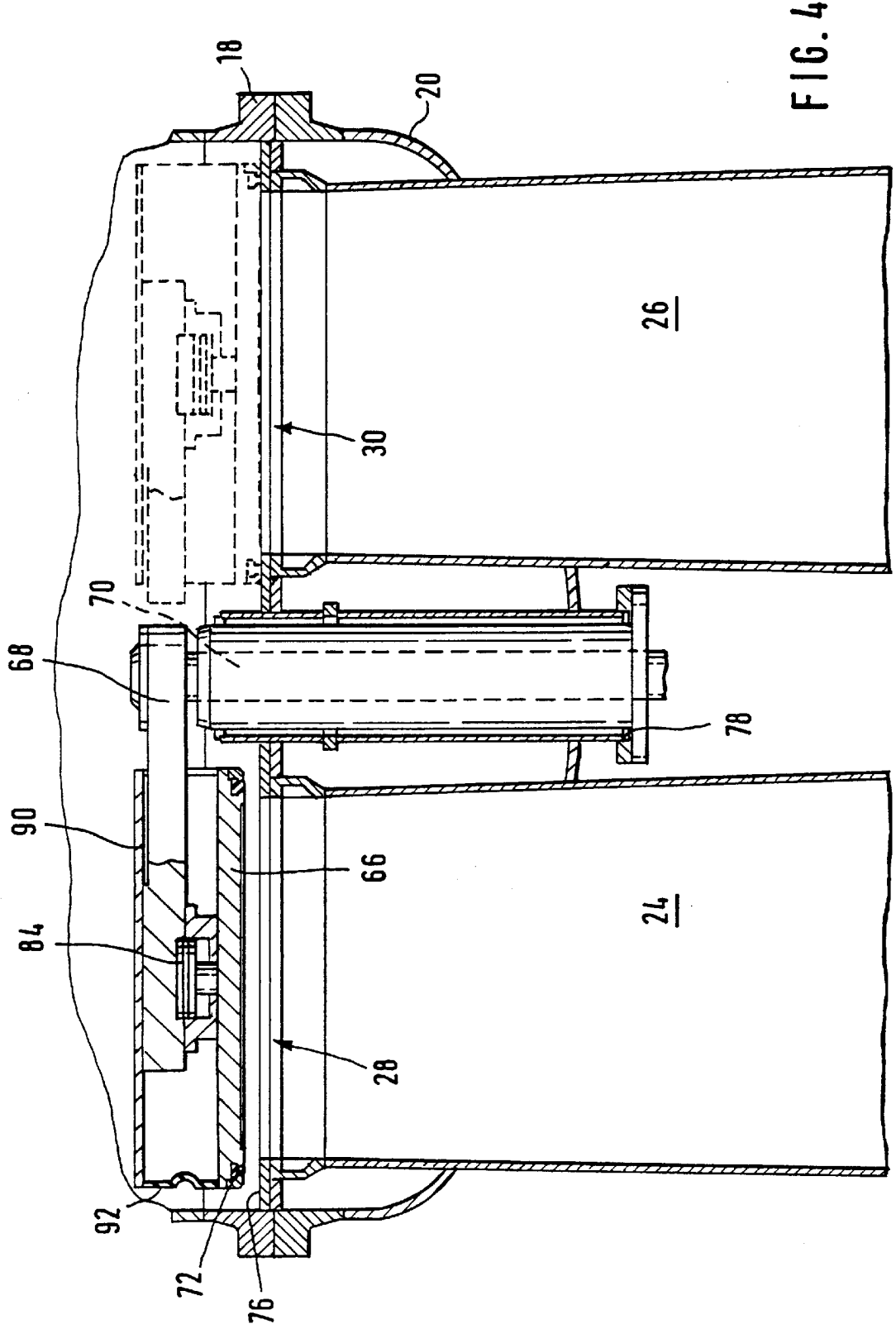
FIG. 4: an enlarged section from FIG. 2, which shows the upper part of the bulk material sluice.
Figure 5:
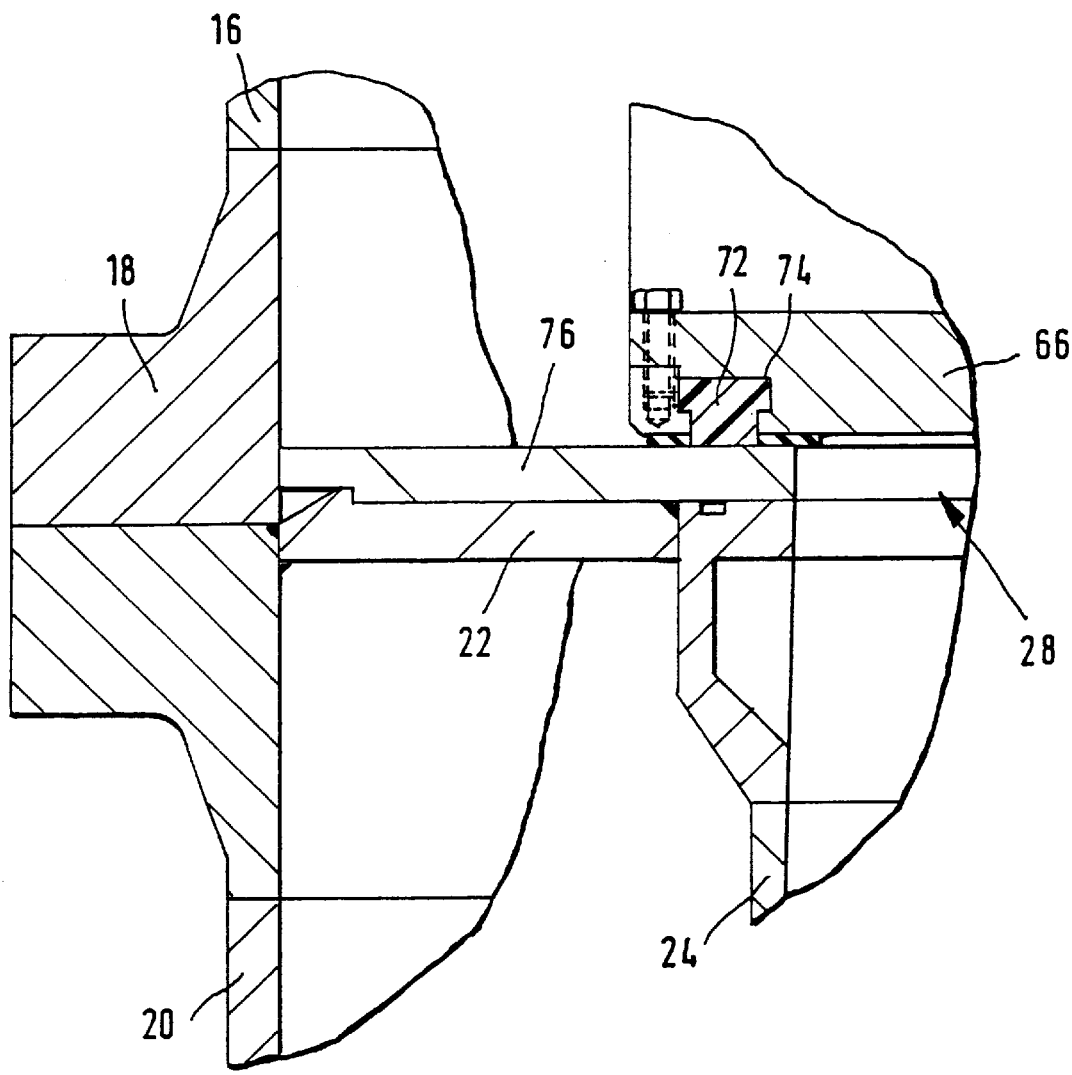
FIG. 5: an enlarged section from FIG. 3.

The upper sealing device is shown in section in FIG. 4 and FIG. 5. It comprises a sealing plate 66, mounted on a vertical swivel pin 70 by means of a rotary arm 68. This swivel pin 70 is arranged perpendicularly to the horizontal plate 22, so that the sealing plate 66 is rotatable in a plane parallel with the plate. The diameter of the sealing plate 66 is greater than the diameter of the orifices 28 and 30 of the sluice bins 24 and 26 in the plate 22, so that the sealing plate 66 can fully cover these orifices 28, 30 when it is immediately above them.

On its underside the sealing plate 66 has a radial seal 72 arranged in a seal seat 74 in the sealing plate 66 at its outer edge (see also FIG. 5). To seal the orifice 28 or 30 the seal 72 advantageously interacts with a wear-resistant, interchangeable plate 76, which covers the plate 22 over its full area, recesses being provided in the plate 76, of course, for the orifices 28 and 30 of the sluice bins 24, 26. This interchangeable plate 76 has a smooth surface as a rotary face and end face for the bulk material.

To swivel the sealing plate 66 from one orifice 28 or 30 to the other, the swivel pin 70 is caused to rotate. This rotation always takes place in the same direction, so that the sealing plate 66 swivels through 360° during a sluicing cycle. For this reason the swivel pin 70 is preferably arranged in such a way that it runs through the centre of the dished end 20, the upper end terminating above the circular plate 76 and the lower end projecting downwards from the dished end 20 through a gastight bushing 78. This has the advantage that a drive motor 80 and a reduction gear with position transmitter 82 (see FIG. 3) for driving the swivel pin 70 are located outside the pressure vessel and are thus easily accessible.

To reduce the friction between the sealing plate 66 and plate 76 when the sealing plate 66 swivels from one orifice 28 to the other 30 (or vice versa) and thus reduce both the required drive power of the drive motor and the wear on seal 72 and plate 76, the sealing plate 66 can be lifted off the plate for swivelling, i.e. it can be moved perpendicularly to the plate 76. In a preferred version a hydraulic cylinder 84 is arranged between the rotary arm 68 and sealing plate 66 for this purpose. This hydraulic cylinder 84 permits vertical adjustment of the sealing plate 66 between a raised position, in which there is no longer any contact between the seal 72 in the sealing plate 66 and the plate 76, and a lowered sealing position, in which the seal 72 in the sealing plate 66 rests against the plate 76 to form a seal. FIG. 4 shows the sealing plate in its raised position above the sluice bin 24. The sealing plate 66 can now be swivelled directly above the orifice 30 of the sluice bin 26 and brought into its lowered position there. This is indicated by a broken line in FIG. 4. Hydraulic fluid is supplied to the cylinder 84 through a duct (not shown), which passes through the swivel pin 70 and the rotary arm 68, and is connected via a rotary bushing 86 (see FIG. 3) to feed lines 88. It should be noted that the top sluice gate performs a positive, self-locking function in the sealing position, i.e. an overpressure in the pressure vessel forces the sealing plate against the plate to form a seal, so that the top sluice gate remains closed and sealed even if the hydraulic cylinder 84 fails.

A ball or universal joint (not shown) permits slight tilting of the sealing plate axis in relation to the vertical. Consequently the sealing plate 66 is accurately aligned with the plate 76 on change-over to the lowered position, so that the seal 72 rests on the plate 76 over its full periphery.

Figure 6:
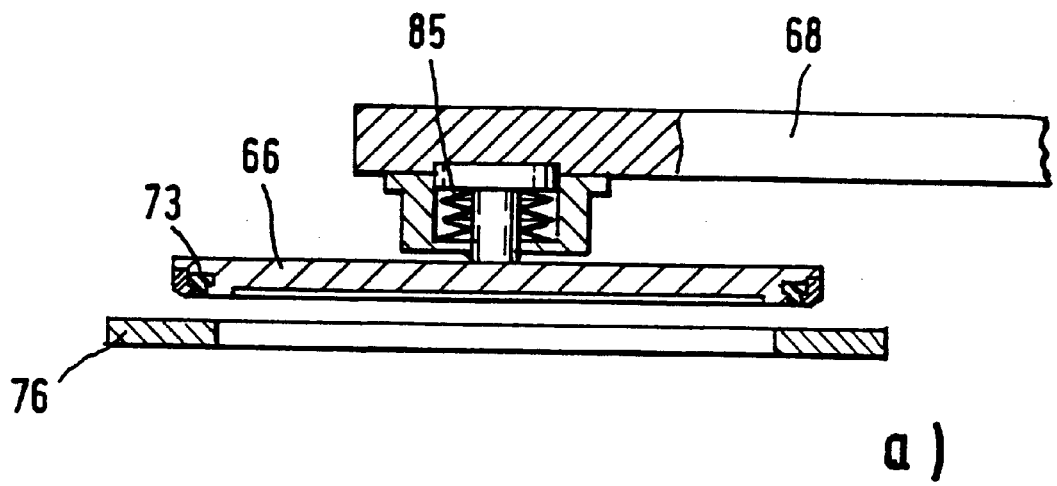
FIG. 6: an alternative device for lifting the sealing plate, a) sealing plate raised, b) sealing plate lowered.
Figure 6:
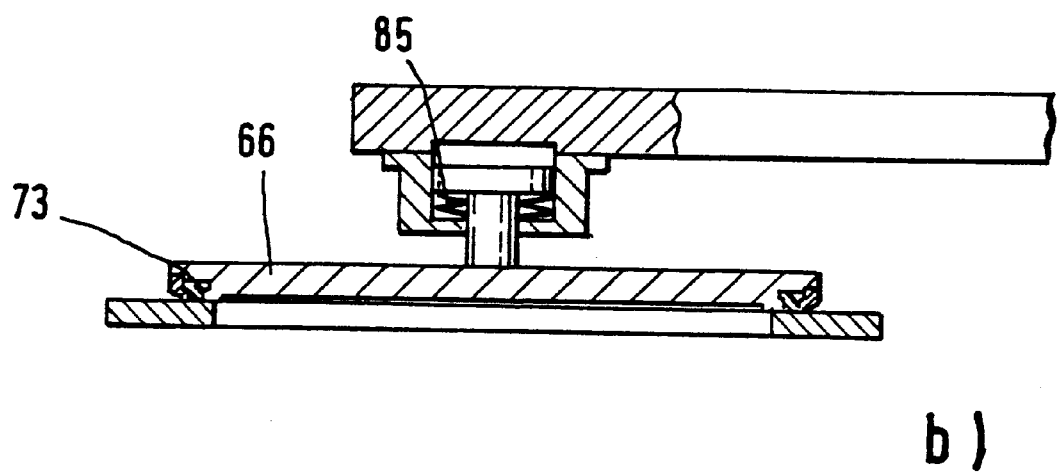

As an alternative to the hydraulic cylinder 84, however, the sealing plate can also be connected to the rotary arm by simple springs (85) in such a way that these springs ensure easy lifting of the sealing plate from the plate. This alternative device for lifting the sealing plate 66 is shown in FIG. 6. In this case the sealing plate 66 advantageously has an inflatable seal 73, which seals the gap between the sealing plate 66 and plate 76 in the inflated condition. After sealing of one of the orifices 28, 30 by inflation of the hose seal, the sealing plate 66 is forced firmly against the plate 76 by the overpressure in the pressure vessel when the pressure is relieved in the corresponding sluice bin 24, 26, so that even in this version the top sluice gate 40 has a positive self-locking sealing function.

A closing plate 90 is mounted above the rotary arm 68 in such a way that it is pushed accurately under the discharge opening of the corresponding discharge shaft 36 or 38 and closes the latter for the bulk material during swivelling of the sealing plate 66 over an orifice 28 or 30. This closing plate is designed in such a way that it fully covers the sealing plate 66 and projects beyond this plate in its front area (in the swivelling direction). Consequently if the top sluice gate 40 is swivelled into a bulk material flow falling from a discharge shaft 36 or 38, the closing plate 90 intercepts the bulk material flow directly below the discharge opening of the corresponding discharge shaft 36 or 38. The bulk material falls on to the closing plate 90 and not on to the sealing plate 66 underneath. When the sealing plate 66 is lifted, consequently only its dead weight need be lifted, hence the hydraulic cylinder 84 or the springs for lifting the sealing plate 66 can have correspondingly small dimensions. To protect the hydraulic cylinder 84 against dust, the space between the sealing plate 66 and the closing plate 90 is additionally closed by a bellows 92.

Figure 7:
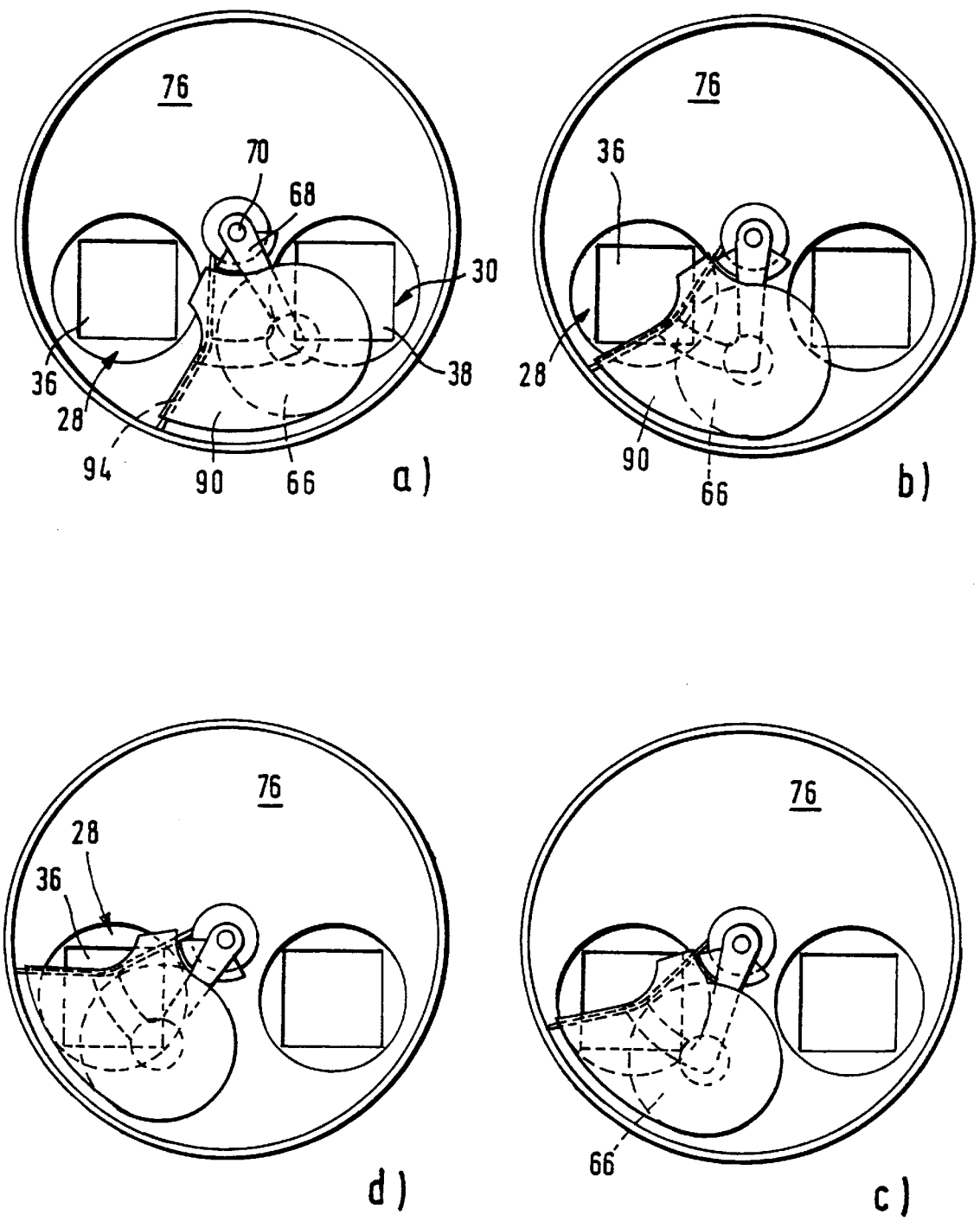
FIG. 7: a plan view of the upper sealing plate, the individual partial figures a)–d) illustrating the function of the bulk material flap and the scraper.

FIG. 7 shows a plan view of the swivelling of the sealing plate into a bulk material flow falling from a discharge shaft 36 in four partial steps a) to d). Plate 76 with the circular orifices 28 and 30 of the two sluice bins 24 and 26 can be seen. The square cross-sections of the discharge shafts 36 and 38 are slightly smaller than a square inscribed in the orifices.

FIG. 7 also shows an advantageous shape of the closing plate 90. In the rear area (viewed in the swivelling direction) the closing plate 90 is essentially the same shape as sealing plate 66. In the front area (viewed in the swivelling direction) by contrast the closing plate 90 is larger than the underlying sealing plate 66, so that closing plate 90 projects at the front. The front edge of the closing plate 90 is designed in such a way that when the plate 90 swivels under a discharge shaft 36, 38, favourable covering of the corners of the discharge shaft 36, 38 results. This is important, because the corners of the discharge shafts 36, 38 are nearest to the boundaries of the orifices 28, 30 and the risk of deposition of the bulk material on the plate 76 is therefore at its highest in this area. To cover the corners of the discharge shafts 36, 38 nearest to the swivel pin 70 as quickly as possible (FIG. 7c), the closing plate 90 therefore has a projecting extension in an (inner) area. By contrast the outer area of the closing plate is shaped in such a way that the last edge of the discharge shaft 36, 38 to be covered is first covered in the area of the last outer corner and only finally in its central area, where the horizontal distance between this edge of the discharge shaft 36, 38 and the boundaries of the orifice 28, 30 is greatest (see FIG. 7d). For this purpose the closing plate 90 has a recess in its central area.

The special shape of the closing plate 90 largely prevents bulk material falling from the discharge shaft 36, 38 on to the plate 76. Such contamination on the plate 76 may impair flush seating of the seal and thus endanger the sealing function of the top sluice gate 40. If bulk material nevertheless reaches the plate 76 this must be removed as far as possible from the plate. For this purpose a scraper 94, which passes over the plate 76 during rotation through 360° and pushes any bulk material in front of it, is mounted under the closing plate 90 near its front edge. The scraper 94 extends from the swivel pin 70 to the edge of the circular plate 76, so that the plate 76 is cleaned immediately before the sealing plate 66 comes to rest on it. The scraper 94 is designed in such a way that bulk material pushed in front of it falls into an orifice 28, 30 during subsequent passage over the latter. For this purpose the scraper 94 preferably has a bend in its centre, the tip of which points opposite the swivelling direction. When the closing plate 90 swivels round, any bulk material on the plate 76 is entrained by the scraper 94, whereby it is conveyed into the throat of the bend because of the inclination of the two scraper halves to a radial line. The bend shape of the rotatable scraper 94 concentrates the scraped bulk material essentially in a circular path, which runs through the centres of the two orifices 28, 30. All bulk material falling on to the plate 76 is accordingly pushed reliably into a sluice bin 24, 26.

Figure 8:
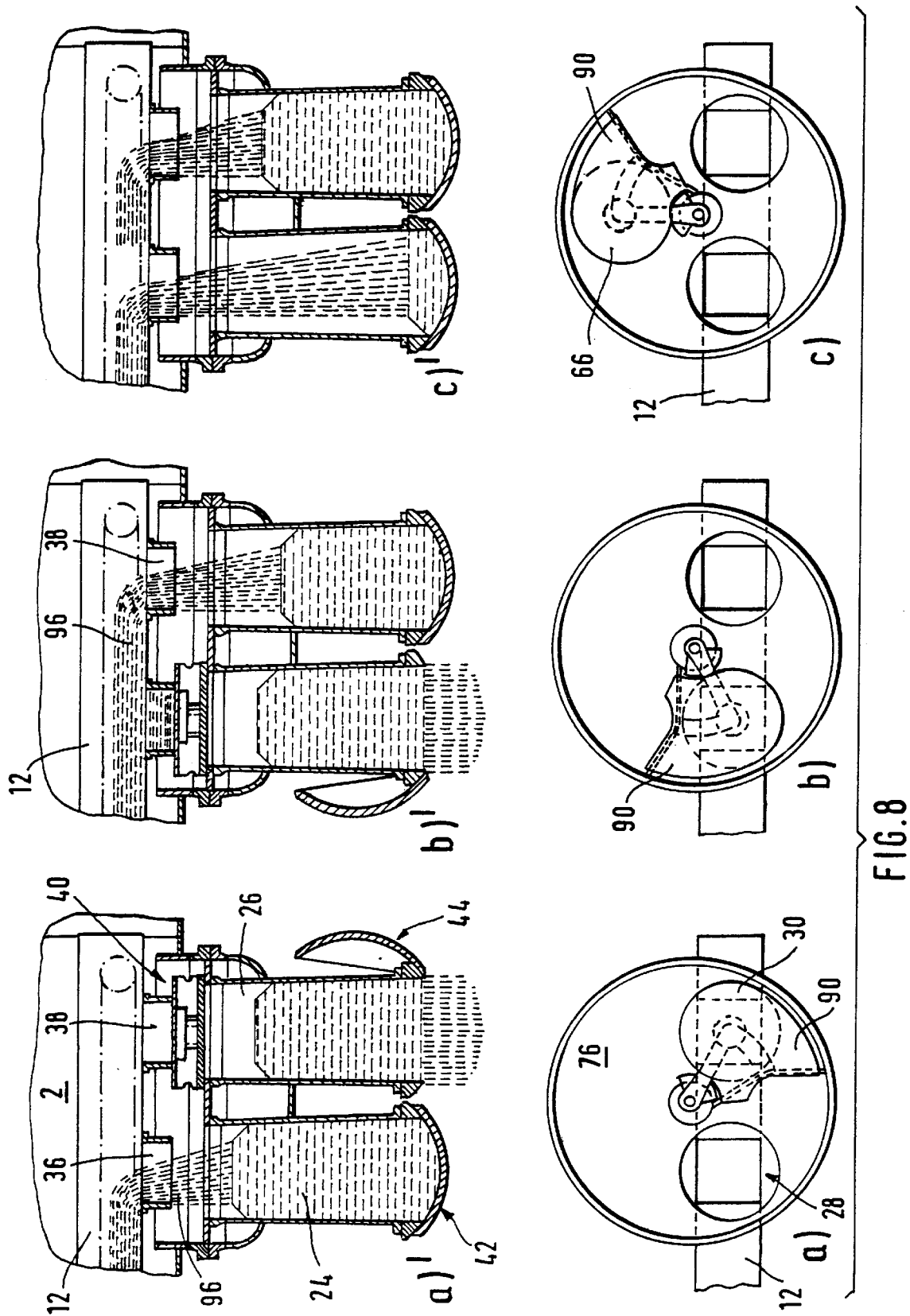
FIG. 8: a functional diagram of the bulk material sluice.

FIG. 8 shows the operating principle of the bulk material sluice described above, with the position of the closing plate with the underlying sealing plate 90 being shown in each case in the lower section. In Fig. a) the front sluice bin 24 is just filled with bulk material 96. The bottom sluice gate 42 is closed and the orifice 28 is open. Consequently the overpressure prevailing in the pressure vessel 2 also prevails in the front sluice bin 24. The bulk material 96 is supplied by the bulk material conveyor 12 and falls through the discharge shaft 36 into the orifice 28 of the sluice bin 24. At the same time as filling of the front sluice bin 24 takes place, the rear sluice bin 26 filled in a preceding stage is emptied. The sealing plate 66 closes the orifice 30 for this purpose (see lower illustration) and pressure equalisation with the environment is established in the sluice bin 26. Following this pressure equalisation the bottom sluice gate can be opened and the sluice bin 26 emptied.

After the sluice bin 26 has been fully emptied, the bottom sluice gate 44 is closed again and pressure equalisation is established between the pressure vessel 2 and sluice bin 26. Meanwhile the sluice bin 24 is filled and must be emptied. The sealing plate 66 is lifted from the orifice 30 and the top sluice gate 40 can be swivelled to the orifice 28 of the sluice bin 24.

The discharge opening of the discharge shaft 36 is closed by swivelling the closing plate 90 with the underlying sealing plate 66 into the bulk material flow under the discharge shaft 36. The discharge shaft 36 is consequently filled with bulk material 96, which continues to be supplied by the bulk material conveyor 12. When the discharge shaft 36 is completely filled with bulk material, further bulk material 96 is conveyed beyond the discharge shaft 36 to the discharge shaft 38 (Fig. b). The bulk material falls through this discharge shaft 38 into the open orifice 30 of the sluice bin 26. Pressure equalisation with the environment meanwhile takes place in the sluice bin 24 sealed by the sealing plate 66, the bottom sluice gate 42 being swivelled sideways after equalisation is complete in order to empty the sluice bin 24.

After the bottom sluice gate 42 has been closed again and pressure equalisation with pressure vessel 2 has taken place in the sluice bin 24, the latter can again receive material. If the filling limit of the sluice bin 26 is now reached, the closing plate 90 with the sealing plate 66 is brought into a position which unblocks both orifices 28 and 30 (Fig. c). The bulk material which had previously accumulated in the discharge shaft 36 falls into the sluice bin 24 and the discharge shaft 36 is again unblocked. The bulk material 96 supplied by the bulk material conveyor 12 can now fall into the sluice bin 24 again. However, bulk material which was conveyed beyond the discharge shaft 36 before it was opened but has not yet reached the sluice bin 30 is still present on the bulk material conveyor 12 between the two discharge shafts 36 and 38. For this reason the sealing plate 66 is first brought into the intermediate position, so that the bulk material in question can still reach the sluice bin 30. Only after this has taken place does the closing plate 90 continue to swivel and the sealing plate 66 seals the orifice 30, after which a new sluicing cycle begins.

Figure 9:
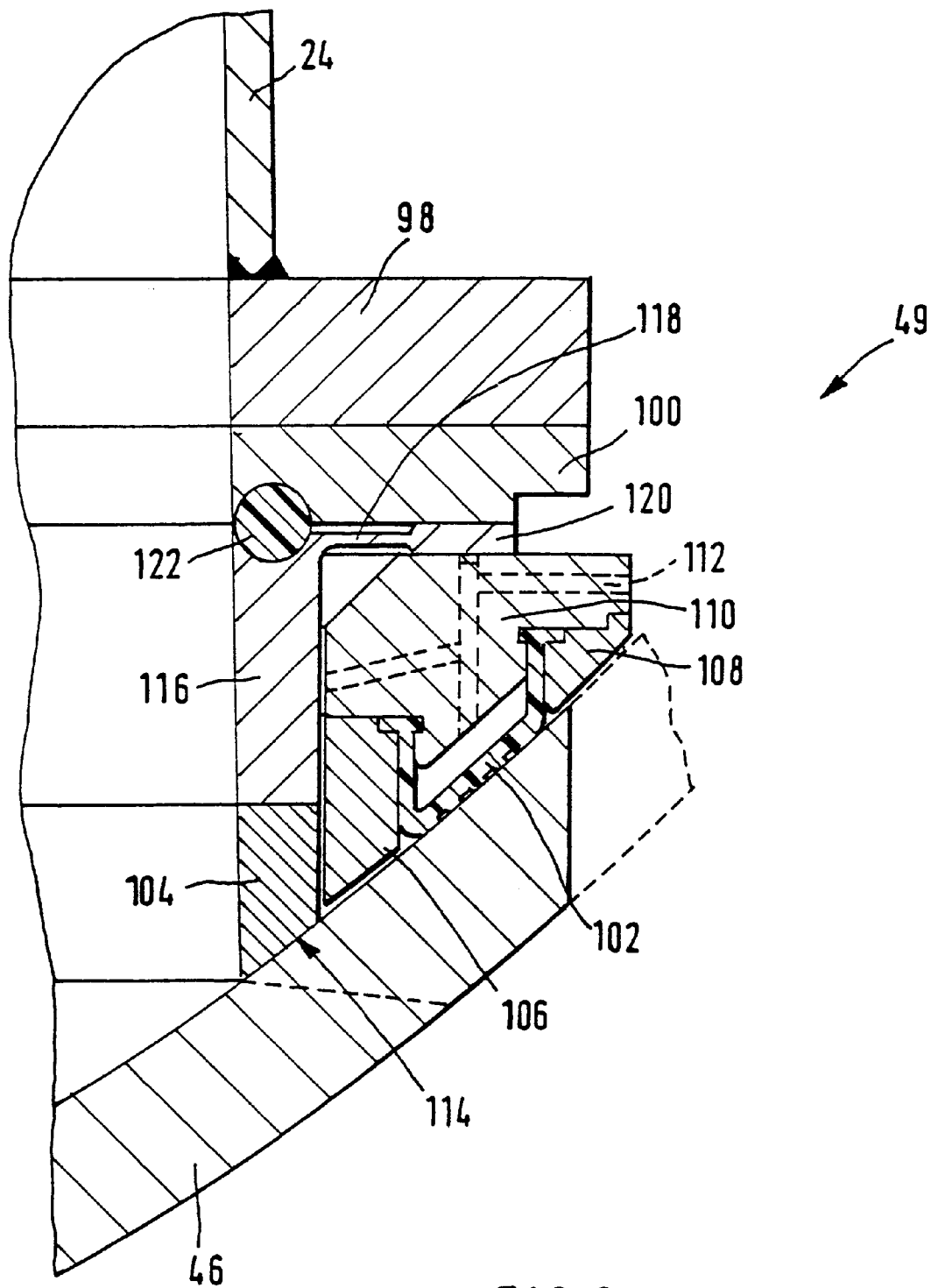
FIG. 9: a section of a first variant of the sealing seat of the bottom sluice gate.

FIG. 9 shows a first variant of sealing seat 49 of the bottom sluice gate 42. As such a sealing seat 49 comprises wearing parts, it is advantageously mounted on the sluice bin 24 in such a way that it is easily interchangeable. For this purpose the sluice bin 24 has at its bottom end a flange 98, to which an upper flange plate 100 of sealing seat 49 is connected.

The sealing seat 49 also comprises an inflatable seal 102, which interacts with the preferably hardened inner face of the sealing cap 46, and an annular bulk material scraper 104, which is arranged in front of the seal 102 when viewed radially outwards and cleans the sealing face during opening and closing of the sealing cap 46 before it comes into contact with the seal 102. The inflatable seal 102 is clamped by two clamping rings 106 and 108 in a seal retaining ring 110, which is bolted to the upper flange plate 100 and which has an internal duct 112 for the supply of pressure medium to the seal 102. A pressure medium acts upon the seal 102 via the duct 112 to seal the bottom sluice gate 42, 44, so that the seal rests firmly against the inner face of the sealing cap 46. If the bottom sluice gate 42 is to be opened, the pressurisation of the seal 102 is stopped so as to reduce the friction with the sealing cap 46 and thus extend the life of the seal 102.

The bulk material scraper 104 is designed as a ring with its outside diameter slightly smaller than the inside diameter of the seal retaining ring 110 and its bottom end face 114 tapered in such a way that it rests against the sealing cap 46. The bulk material scraper is pressed with a certain force against the inner face of the sealing cap 46 by a clamping ring 116 arranged above the bulk material scraper 100. The clamping ring 116 may have at its top end a projection 118 extending radially outwards, which is designed as a cup spring and provided with an axially widened clamping lug 120 on its outer edge. The clamping ring 116 can be clamped by the clamping lug 120 between the flange plate 100 and seal retaining ring 110 and bolted to the latter, the clamping ring 116 being arranged radially within the seal retaining ring 110 and radial play occurring between the clamping ring 116 and seal retaining ring 110. Because of the larger axial dimensions of the clamping lug 120 a gap is also formed between the cup spring 118 and flange plate 100 and between the cup spring 118 and seal retaining ring 110. The clamping ring 116 is thus mounted flexibly within the seal retaining ring 110 and can be vertically deflected to a certain extent. An elastomer ring 122 is clamped between the flange plate 100 and the clamping ring 116 and performs the function of closing the gap between the flange plate 100 and cup spring 118 to prevent bulk material falling in. Both the underside of the flange plate 100 and the top end face of the clamping ring 116 preferably each have peripheral grooves with a semi-circular cross-section, which are axially opposite each other and in which the elastomer ring 122 is arranged. The flexibly mounted clamping ring 116 is pretensioned by the cap 46 in such a way that the required contact pressure between the bulk material scraper 104 and cap inner face is produced.

It should be noted that a bottom sluice gate 42 with such a sealing seat 49 ensures high security against a sudden pressure loss. As the gap between the clamping rings 106, 108, with which the inflatable seal 102 is secured to the seal retaining ring, and the inner face of the sealing cap 46 is very small, only a small quantity of gas can escape through this gap. A sudden pressure drop thus cannot occur in the sluice bin 24 even if the inflatable seal 102 is destroyed or its pressure medium supply fails. As, furthermore, the concave curvature of the sealing cap 46 faces the sluice bin 24 and the axis of rotation 54 thus lies above the sealing cap 46, the sluice gate cannot open automatically even if all media supplies fail, because the sealing cap 46 is held in its closed position by the force of gravity.

Figure 10:
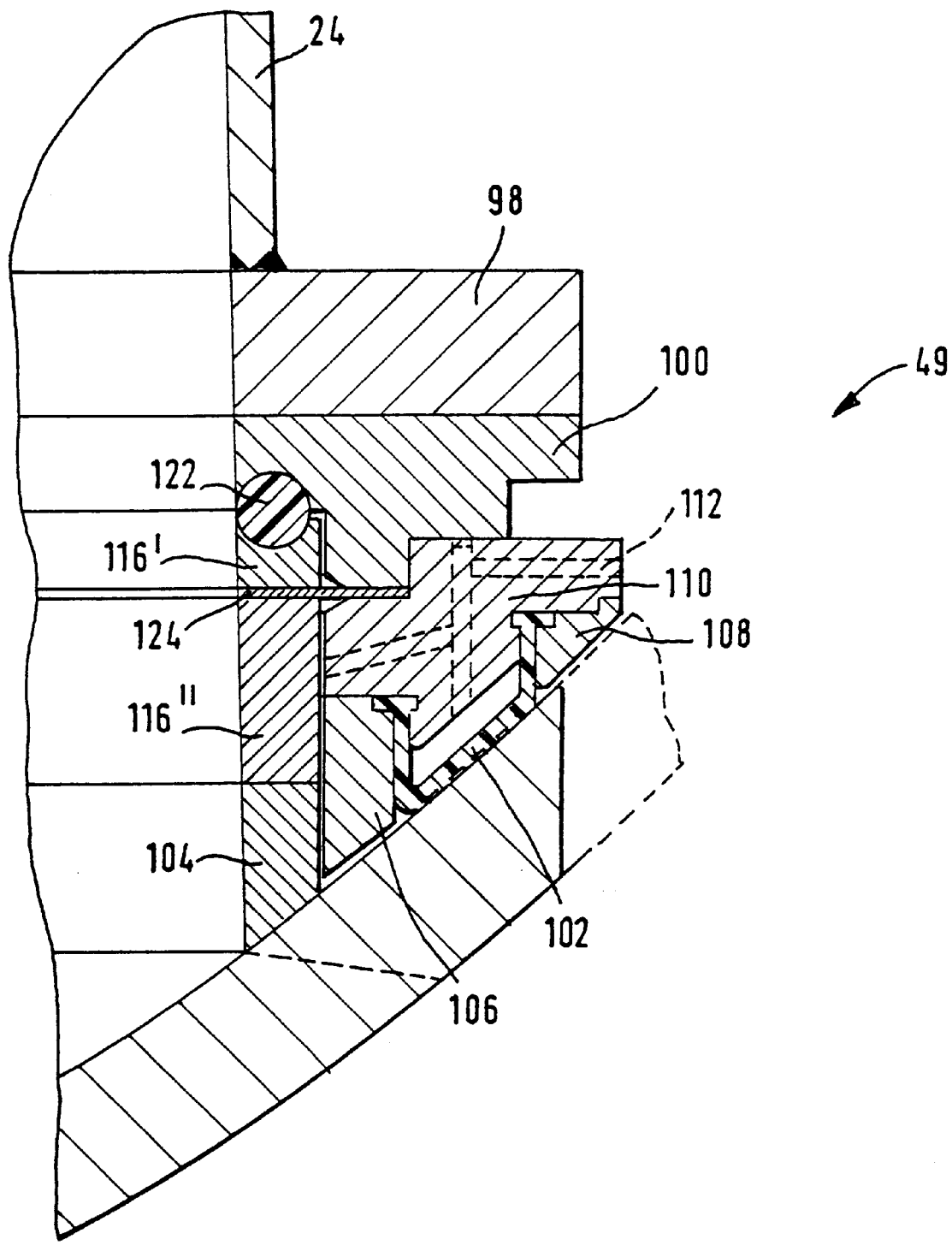
FIG. 10: a section of a second variant of the sealing seat of the bottom sluice gate.

In the variant of the sealing seat 49 shown in FIG. 10, the clamping ring comprises two partial rings 116' and 116" arranged one above the other, which are bolted together with a spring washer 124 clamped between them. The upper partial ring 116' incorporates the peripheral groove with a semi-circular cross-section, in which elastomer ring 122 is arranged. The outside diameter of the spring washer 124 is significantly larger than the outside diameter of the two partial rings 116' and 116", so that the spring washer 124 projects radially outwards between the two partial rings 116' and 116". The spring washer 124 is firmly clamped between the flange plate 100 and the seal retaining ring 110 by the projecting outer area, so that flexible suspension of the clamping ring is achieved also in this embodiment. The spring washer 124 can also be replaced by radially arranged leaf springs.

Figure 11:
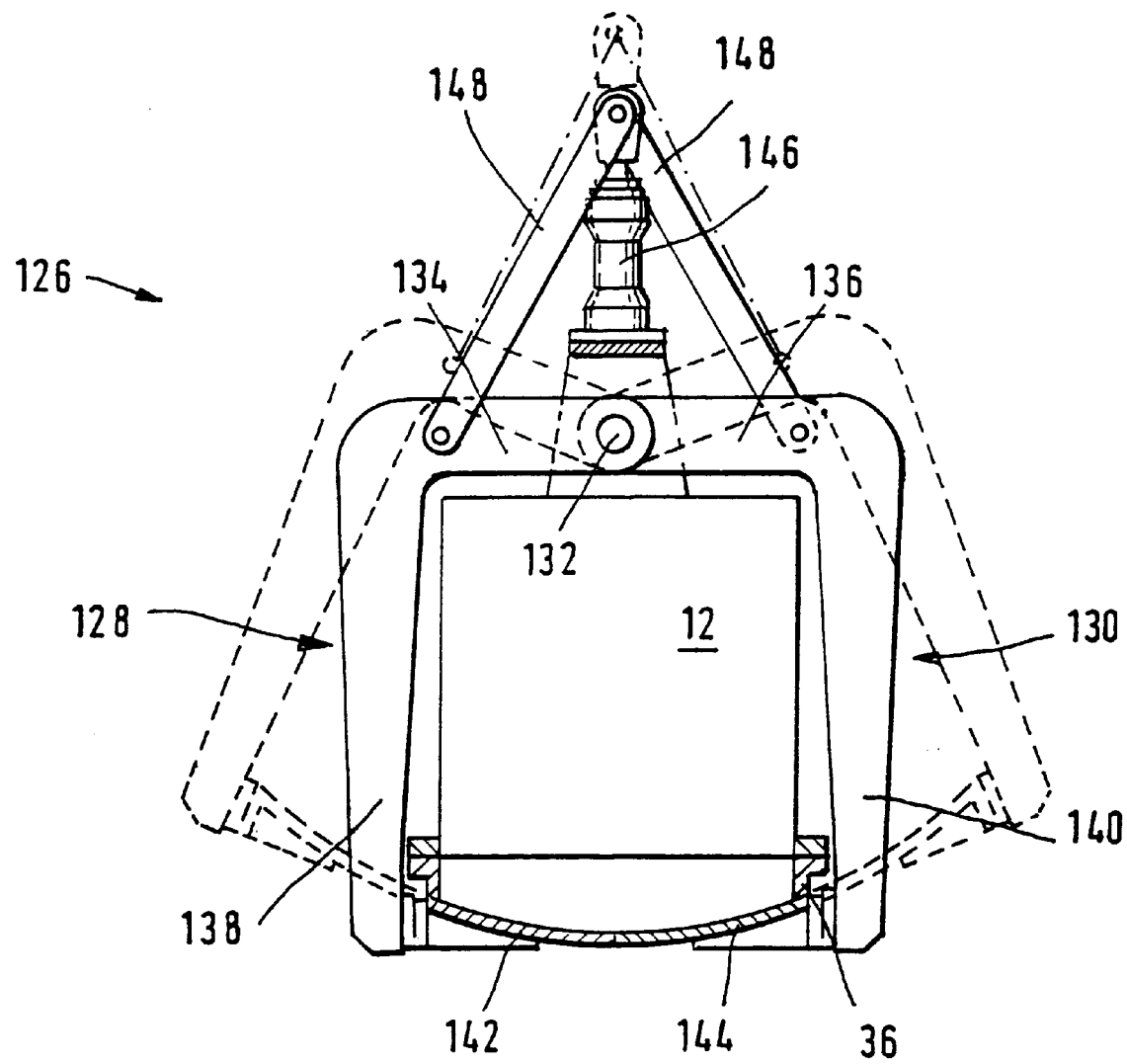
FIG. 11 a bulk material flap for an alternative embodiment of the bulk material sluice according to the invention.

FIG. 11 shows a bulk material flap 126 for an alternative embodiment of the top sluice gate 40. Instead of the closing plate 90 arranged above the rotary arm 68, the bulk material flow through the discharge shaft 36 can also be prevented by a bulk material flap 126, which encloses the bulk material conveyor 12 perpendicularly to the conveying direction at the height of the discharge shaft 36 and can close the latter.

For this purpose the bulk material flap 126 advantageously comprises two angled rotary arms 128 and 130, which are each pivoted at one end on a shaft 132 running in the conveying direction above the conveyor 12. The rotary arms 128 and 130 are arranged opposite each other in such a way that when the bulk material flap 126 is closed, the first section 134 or 136 of the rotary arms 128 or 130 extend essentially horizontally in opposite directions and that the respective second sections 138 or 140 extend essentially vertically downwards, whereby the rotary arms 128,130 enclose the bulk material conveyor 12 and the bottom ends of the two sections 138 or 140 project below the shortened discharge shaft 36. A cylindrical closing plate 142, 144 is mounted on these bottom ends of the second sections 138 or 140. These closing plates 142 and 144 meet each other in the centre below the discharge shaft 36 when the bulk material flap 126 is closed and close the shaft for the bulk material. However, overlapping closing plates 142 and 144 can also be advantageously used. These overlapping closing plates 142 and 144 then have corresponding cut-out sections, which interact when the closing plates 142 and 144 separate to unblock an opening centered on the axis of the underlying orifice 28, 30. To open the bulk material flap 126 and release the discharge shaft 36, the closing plates 142, 144 are swivelled sideways at their rotary arms 128 and 130, the rotation taking place about the shaft 132. For this purpose a hydraulic cylinder 146, on the piston of which the top ends of two connecting rods 148 are pivoted, is arranged on the shaft 132. The bottom ends of the two connecting rods 148 are pivoted on the rotary arms 128 and 130, the points of application being in the area of the bend in the corresponding rotary arm 128 or 130 in each case.

On actuation of the hydraulic cylinder 146 the piston movement is transmitted by the two connecting rods 148 to the rotary arms 128, 130 and their bottom ends are moved apart with the attached closing plates 142 and 144 perpendicularly to the conveying direction. The opened position of the bulk material flap is depicted by a broken line in FIG. 11.

Figure 12:
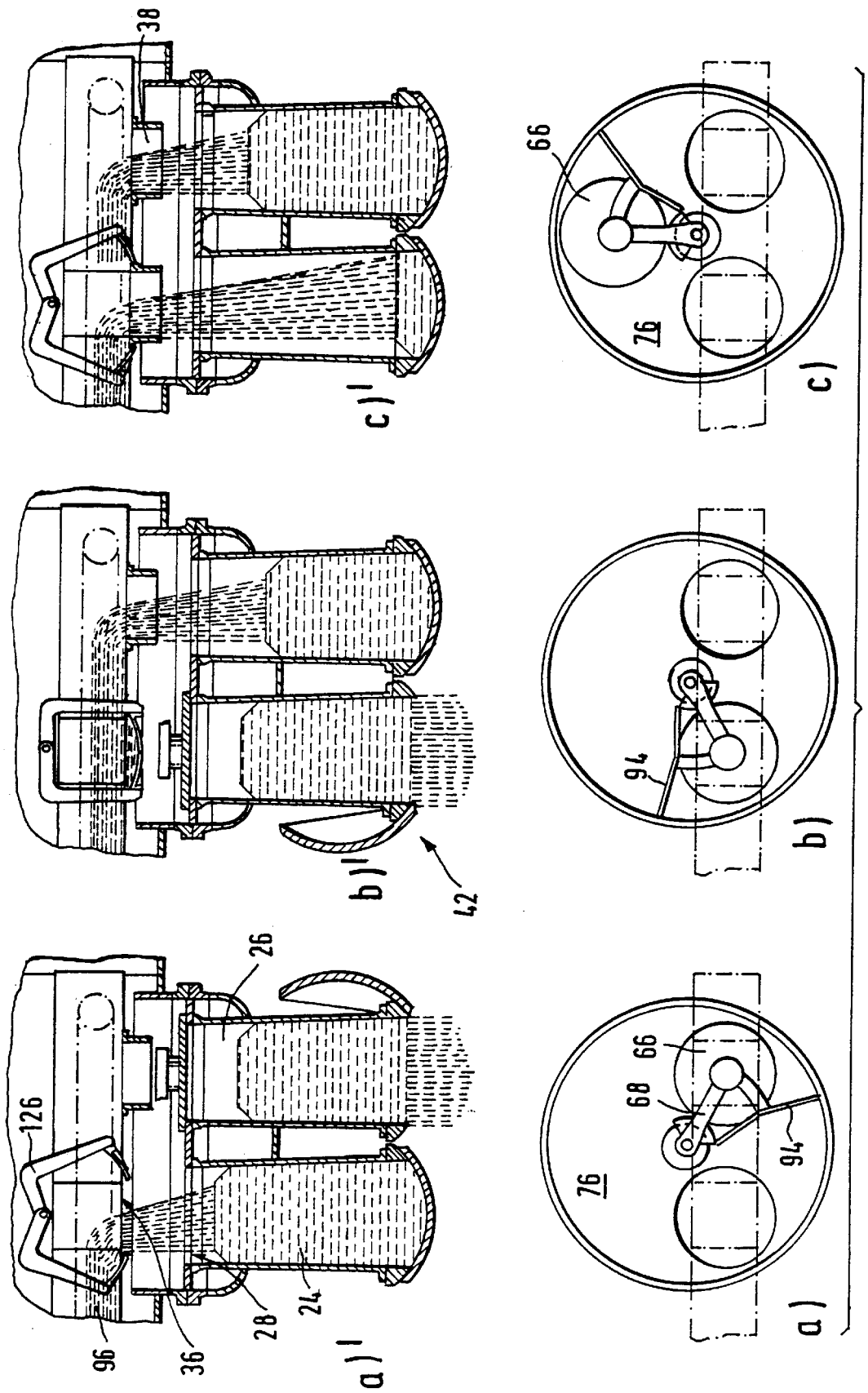
FIG. 12: a functional diagram of an alternative embodiment of the bulk material sluice with bulk material flap according to the invention.

FIG. 12 shows, as in FIG. 8, the operating principle of a bulk material sluice with bulk material flap 126, the latter being shown rotated through 90°. It can be seen in the lower illustrations that no closing plate 90, but only a scraper 94 is mounted on the rotary arm 68. However, the operating principle of the bulk material sluice is basically the same as that of the bulk material sluice in FIG. 8. While the sluice bin 28 is being emptied and for this reason is closed by the top sluice gate 40, the sluice bin 24 is filled with bulk material (Fig. a). For this purpose the bulk material flap 126 is opened, so that the bulk material 96 supplied by the bulk material conveyor 12 can fall through the shortened discharge shaft 36 into the orifice 28 of the sluice bin 24.

When the sluice bin 24 is full, the bulk material flap 126 closes to interrupt the bulk material flow through the discharge shaft 36. Consequently the discharge shaft is filled with bulk material and newly supplied bulk material is conveyed to the sluice bin 26, which is meanwhile subjected to overpressure and unblocked. The sealing plate 66 is swivelled to the sluice bin 24 and lowered to form a seal on its orifice 28. After pressure equalisation with the environment the bottom sluice gate 42 is opened and the bin is emptied (Fig. b). After the emptying the bottom sluice gate 42 is closed again and the sluice bin 24 is brought to overpressure.

If the sluice bin 26 now reaches its filling limit, the sealing plate 66 is brought into an intermediate position, which unblocks both orifices 28 and 30 (Fig. c, bottom). The bulk material flap 126 is then opened and the bulk material which had previously accumulated in the discharge shaft 36 then falls into the sluice bin 24 and the discharge shaft 36 is again unblocked. The bulk material 96 supplied can now fall into the sluice bin 24 again. As the sealing plate 66 is in its intermediate position, bulk material which was conveyed beyond the discharge shaft 36 before it opened but has not yet reached the sluice bin 30 can continue to fall through the discharge shaft 38 into the sluice bin 26. Only after this has taken place does the sealing plate 66 continue to swivel and seal the orifice 30, after which a new sluicing cycle begins.

Figure 13:
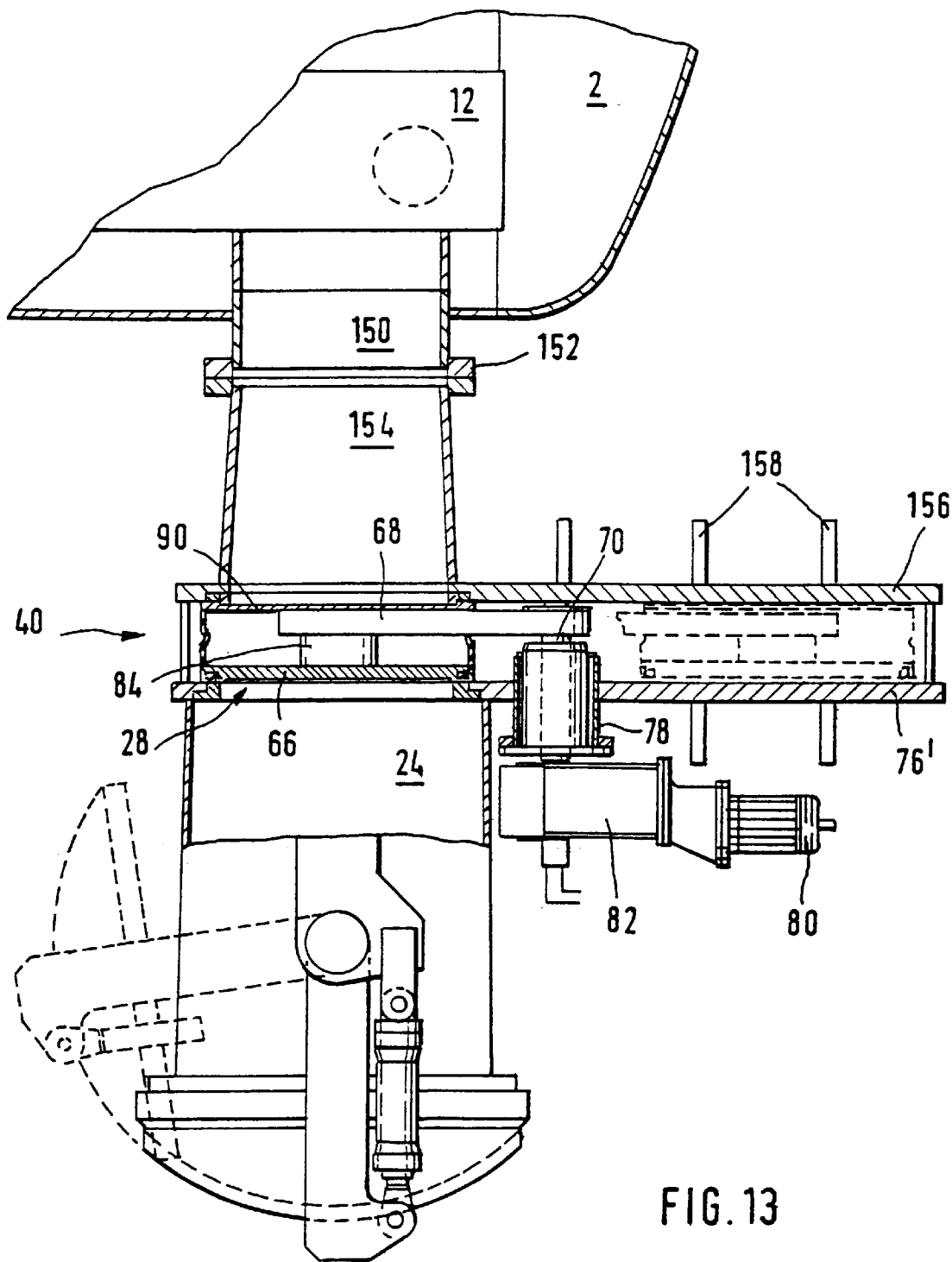
FIG. 13: a third variant of the bulk material sluice according to the invention.

FIG. 13 shows a further embodiment of the device according to the invention. In this case it is a embodiment with a single sluice bin 24. In this case only one connection piece 150 designed as a discharge shaft with a flange 152 at its bottom end is led out of the pressure vessel 2. The sluice device is mounted on this flange.

This sluice device comprises a tubular sluice ante-chamber 154 open at both ends, the bottom opening being slightly larger than the top one, so that the sluice ante-chamber 154 is flared at the bottom. This tapered shape prevents a column of bulk material in the ante-chamber 154 blocking the latter and discharge of the bulk material into the sluice bin 24 when sluice gate 40 is open. A pressure casing 156 with an essentially circular horizontal cross-section is mounted at the bottom end of the sluice ante-chamber 154. A sluice bin 24 is arranged as an axial extension of the sluice ante-chamber 154 under the pressure casing 156.

A top sluice gate 40 of the type described above with sealing plate 66 and closing plate 90 is housed in the pressure casing 156. The plate 76', which is circular, corresponds to plate 22, 76 in FIG. 5. The (shortened) swivel pin 70 is arranged in the centre of the circular pressure casing 156 and in this case, too, is led out of the latter through a gastight bushing 78 and is driven at its bottom end (as in FIG. 3) by a drive motor 80 via a gear 82. On its outside the pressure casing 156 has reinforcing stays 158, which prevent bulging of the casing walls because of the overpressure prevailing in the pressure casing 156.

If the top sluice gate 40 has been swivelled away laterally (broken line in FIG. 13), the sluice bin 24 can be filled with bulk material. The bulk material supplied by the conveyor 12 falls through the sluice bin ante-chamber 154 and through the pressure casing 156 into the sluice bin 24. When the sluice bin 24 is full, the top sluice gate 40 swivels into its closing position, in which the bottom discharge opening of the sluice ante-chamber 154 is closed for the bulk material by the closing plate 90 and the orifice of the sluice bin is sealed in the plate 76' by the sealing plate 66. In the sluice bin 24, pressure equalisation with the environment is subsequently established before the bottom sluice gate 42 is opened and the sluice bin 42 is emptied. The bottom sluice gate 42 then closes again and pressure equalisation with the pressure vessel is established in the sluice bin 24. During this time the bulk material supplied by the bulk material conveyor 12 accumulates above the closing plate 90 in the sluice ante-chamber 154. The sealing plate 66 is then lifted by the hydraulic cylinder 84 and swivelled under the opening. The bulk material accumulated in the sluice ante-chamber 154 then falls into the sluice bin 24 and again unblocks the passage, so that a new cycle can begin. The rotary arm 68 is also swivelled through 360° in this version, so that a scraper can remove bulk material particles from the flat plate before the sealing plate is forced against the plate.

We claim:

1. A device for the discharge of bulk material from a pressure vessel, comprising:
    a plate;
    at least one sluice bin with a bottom sluice gate and a top sluice gate, said at least one sluice bin being arranged under the plate and forming an orifice in said plate for the bulk material,
    said top sluice gate comprising a sealing member, which is arranged above said plate, and
    wherein the arrangement of said device is such that said sealing member is positionable above the orifice for said bulk material and is positionable into a sealing arrangement about an edge of the orifice and, upon a sealing connection of said sealing member about an edge of the orifice being made, said sealing connection is such that an overpressure in the pressure vessel causes the sealing member to be pressed against the edge of the orifice.

2. Device according to claim 1, wherein said plate is circular and completely flat, wherein said orifice for the bulk material is arranged eccentrically in said plate and an upper end of the orifice lies flush with an upper surface of said plate, wherein said sealing member is rotatable about a center of said plate, and wherein a scraper is mounted on said sealing member in such a way that said scrapper fully wipes said plate when said sealing member turns through 360°.

3. Device according to claim 1, wherein said sealing member is moveable perpendicularly to the plate by a hydraulic cylinder.

4. Device according to claim 1, wherein said sealing member includes an elastic element positioned in such a way that said elastic element lifts said sealing member off the plate when pressures prevailing in the pressure vessel and the sluice bin are equalized.

5. Device according to claim 1, characterized in that the sealing member comprises an inflatable seal.

6. Device according to claim 1, characterized in that the bottom sluice gate comprises a spherical sealing cap, said spherical sealing cap comprising a concave curvature which is associated to the sluice bin.

7. Device according to claim 6, characterized in that said bottom sluice gate comprises a sealing seat with an inflatable sealing ring.

8. Device according to claim 7, characterized in that said inflatable sealing ring encloses an annular scraper, and said device includes at least one spring associated to said annular scraper in such a way that said annular scraper is forced against the concave curvature of said sealing cap.

9. Device according to claim 8, characterized in that said annular scraper is clamped in the sealing seat by a spring washer.

10. Device according to claim 8, characterized in that said annular scraper rests axially on said sealing seat via an elastomer ring.

11. Device according to claim 8, characterized in that an annular gap is arranged between said inflatable sealing ring and said annular scraper, said annular gap being connectable to a flushing gas supply.

12. Device according to claim 1, characterized in that the sealing member comprises a sealing plate.

13. Device for the discharge of bulk material from a pressure vessel, comprising a plate, a first sluice bin, a second sluice bin, a bottom sluice gate and a top sluice gate, said first and second sluice bins being arranged under the plate and forming respectively a first and a second orifice in said plate for the bulk material, and said top sluice gate comprising a sealing member, which is arranged above said plate, and wherein said device is arranged such such that said sealing member is positionable as well above the first orifice as above the second orifice for said bulk material and, after a sealing connexion of said sealing member to an edge of one of said first and second orifices has been made, said sealing member is arranged such that an overpressure prevailing in said pressure vessel acts to press said sealing member against the edge of the respective orifice.

14. Device according to claim 13, wherein said plate is circular and completely flat, wherein said first and second orifices for the bulk material are arranged eccentrically in said plate and have an upper end lying flush with an upper surface of said plate, wherein said sealing member is rotatable about a center of said plate, and wherein a scraper is mounted on said sealing member in such a way that said scraper fully wipes said plate when said sealing member turns through 360°.

15. Device according to claim 13, wherein said sealing member is movable perpendicularly to the plate by a hydraulic cylinder.

16. Device according to claim 13, wherein an elastic element is associated to said sealing member in such a way that said elastic element lifts said sealing member off the plate when pressures prevailing in the pressure vessel and the sluice bin are equalized.

17. Device according to claim 16, characterized in that the sealing member comprises an inflatable seal.

18. Device according to claim 13, comprising a discharge opening for the bulk material axially above each of said first and second orifices for said bulk material and a retaining device for the bulk material assigned to said discharge opening.

19. Device according to claim 18, wherein said retaining device for the bulk material comprises a closing plate, which can be positioned together with said sealing member, said closing plate being arranged and designed in such a way that said closing plate closes the discharge opening when said sealing member is arranged above a corresponding orifice.

20. Device according to claim 19, characterized in that said closing plate and said sealing member are carried by a common rotary arm.

21. Device according to claim 20, wherein said closing plate projects over said sealing member in the direction of rotation and comprises a central recess.

22. Device according to claim 13, further comprising a continuous conveyor for conveying material in the pressure vessel, said continuous conveyor comprising two separate discharge openings at a conveyor end, a first discharge opening of said two separate discharge openings comprising a retaining device for the bulk material.

23. Device according to claim 22, wherein said retaining device for the bulk material comprises two closing plates each having a closing edge, said closing plates being movable into a closing position in which said closing plates rest against each other with the respective closing edges under said first discharge opening.

24. Device according to claim 22, wherein said retaining device for the bulk material comprises two cylindrical closing plates, said closing plates being movable into a closing position in which said closing plates overlap.

25. Device according to claim 13, further comprising a dished boiler end arranged under said plate and forming a pressure chamber under said plate, said pressure chamber being connected to said pressure vessel with a pressure compensator.

26. Device according to claim 13, characterized in that the bottom sluice gate comprises a spherical sealing cap for each sluice bin, said spherical sealing cap comprising a concave curvature which is associated to a respective sluice bin.

27. Device according to claim 26, characterized in that said bottom sluice gate comprises a sealing seat with an inflatable sealing ring.

28. Device according to claim 27, characterized in that said inflatable sealing ring encloses an annular scraper, and in that one or more springs are associated to said annular scrapper in such a way that said annular scraper is forced against the concave curvature of said sealing cap.

29. Device according to claim 28, characterized in that said annular scraper is clamped in the sealing seat by a spring washer.

30. Device according to claim 28, characterized in that said annular scraper rests axially on said sealing seat via an elastomer ring.

31. Device according to claim 28, characterized in that an annular gap is arranged between said inflatable sealing ring and said annular scraper, said annular gap being connectable to a flushing gas supply.

32. Device according to claim 13, characterized in that the sealing member comprises a sealing plate.

* * * * *